Patented Oct. 20, 1936

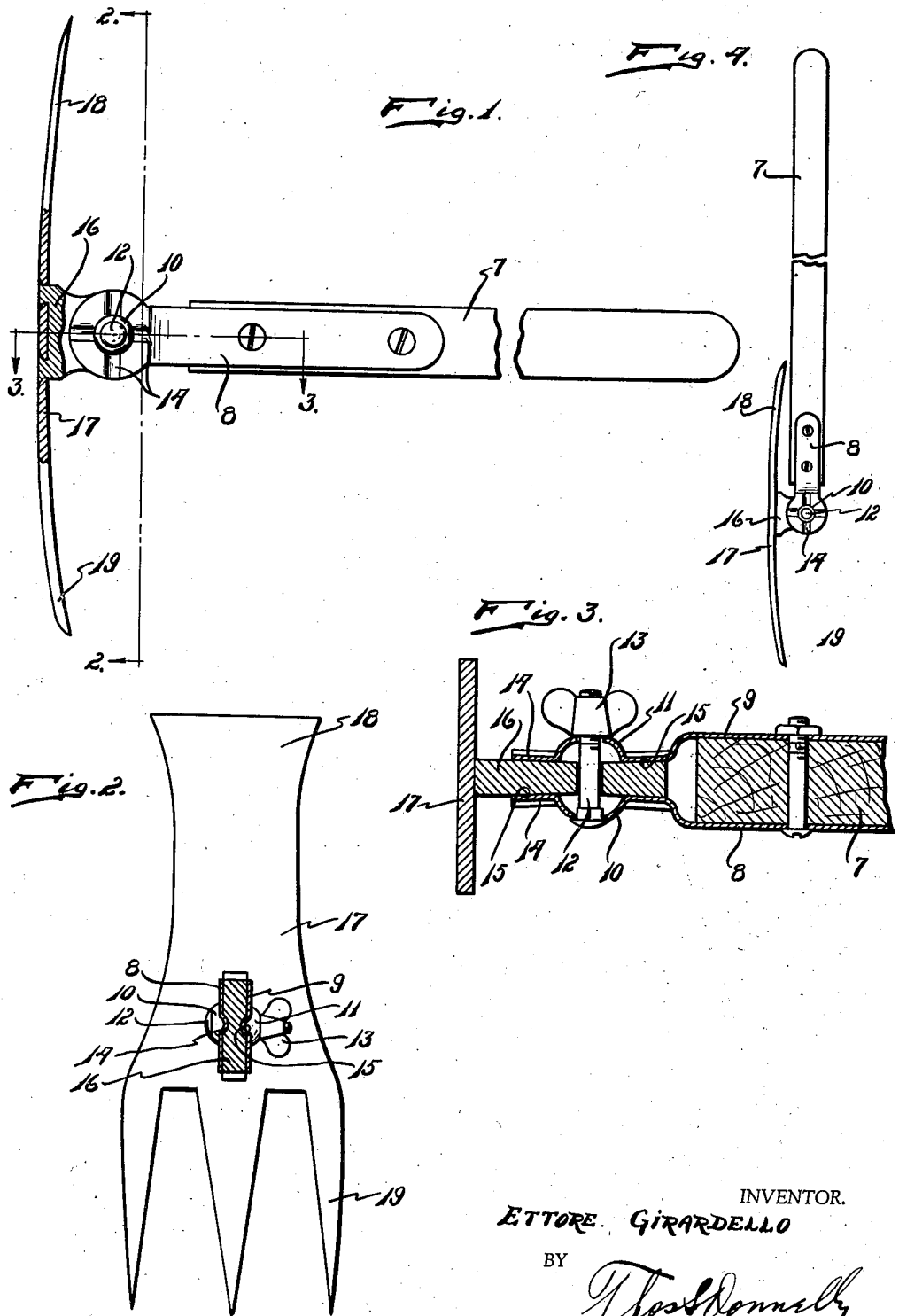

2,058,225

UNITED STATES PATENT OFFICE 2,058,225

GARDEN TOOL

Ettore Girardello, Detroit, Mich.

Application August 9, 1933, Serial No. 684,307

1 Claim. (Cl. 306—17)

My invention relates to a new and useful improvement in a garden tool and has for its object the provision of a tool which may be economically manufactured, durable in its construction, light, compact and highly efficient in use.

Another object of the invention is the provision of a garden tool so constructed and arranged as to lend itself to a multiplicity of uses.

Another object of the invention is the provision of a work head mounted on a suitable handle in such a manner that it may be turned in various angles thereto and extended parallel thereto when desired.

Other objects will appear hereinafter.

The invention consists in the combination and arrangement of parts hereinafter described and claimed.

The invention will be best understood by a reference to the accompanying drawing which forms a part of this specification, and in which, Fig. 1 is a side elevational view of the invention with parts broken away and parts shown in section.

Fig. 2 is a view taken on line 2—2 of Fig. 1.

Fig. 3 is a sectional view taken on line 3—3 of Fig. 1.

Fig. 4 is a side elevational view of the invention showing the work head extended parallel to the handle.

The invention comprises a handle 7 projecting outwardly from one end of which at opposite sides thereof are plates 8 and 9. Each of these plates is bulged outwardly to provide the heads 10 and 11 respectively through which is projected a binding bolt 12 on which is threaded the wing nut 13. Each of these plates is pressed inwardly to provide the inwardly projecting ribs 14 adapted to engage in the grooves 15 of the plate 16 which projects from the tool head 17. One end 18 of this tool head is tapered to the outer edge to provide a wedge or a like construction. The other end is provided with the teeth 19.

The device may be used as a hoe when the tool head or plate 17 is extended at right angles to the axis of the handle 7 as shown in Fig. 1 and in Fig. 2. The teeth 19 may be used for the purposes of raking, cultivating or the like. It is obvious that the tool head 17 may be tilted at various angles to the handle 7 upon a loosening of the nut 13 and a tilting of the head 17. This angularity may be changed so that the tool head or plate 17 may extend parallel to the handle as shown in Fig. 4. In this position the teeth 19 may be used for digging or other similar purposes, or, when the blade portion 18 is projected outwardly, the same may be used for digging purposes or for dandelion removal.

With a garden tool of this type, a maximum amount of work may be done with a single tool, as the provision of the blade 18 and the teeth 19 arranged to extend at various angles to the handle, permits the operator to adjust the tool to his own individual likes and to the needs of the work to be performed.

It is believed obvious that the device is of economical manufacture, is light and compact, while at the same time of a durable form of construction.

While I have illustrated and described the preferred form of construction of my invention, I do not wish to limit myself to the precise details of structure shown, but desire to avail myself of such variations and modifications as may come within the scope of the appended claim.

Having thus described my invention, what I claim as new and desire to secure by Letters Patent is:

A device of the class described, comprising: a handle; a pair of plates, each mounted on said handle at opposite sides thereof, and each projecting outwardly beyond the end of said handle, each of said plates being outwardly bulged intermediate its ends and beyond the end of said handle to provide a hollow head, said bulged portions having aligning openings formed therein; a tool head; a plate projecting outwardly from one face of said tool head and engaging between the plates on said handle and engaging the inner faces of said plates at opposite sides of the hollow head; a bolt projected through said tool head plate and through said handle plates for clamping said handle plates against opposite faces of said tool head plate; and a rib formed on the inner face of said handle plates and engaging in a groove formed in said tool head plate.

ETTORE GIRARDELLO.